United States Patent
Hamilton

(10) Patent No.: US 7,769,054 B2
(45) Date of Patent: Aug. 3, 2010

(54) METHOD OF CONDUCTING A COMMUNICATIONS SESSION USING INCORRECT TIMESTAMPS

(75) Inventor: Mark A. Hamilton, Superior, CO (US)

(73) Assignee: Polycom, Inc., Pleasanton, CA (US)

( * ) Notice: Subject to any disclaimer, the term of this patent is extended or adjusted under 35 U.S.C. 154(b) by 667 days.

(21) Appl. No.: 11/591,646

(22) Filed: Nov. 1, 2006

(65) Prior Publication Data

US 2008/0159240 A1    Jul. 3, 2008

(51) Int. Cl.
*H04J 3/06* (2006.01)

(52) U.S. Cl. ........................ 370/503; 370/518
(58) Field of Classification Search ......... 370/412–418, 370/474, 503, 516, 517, 519
See application file for complete search history.

(56) References Cited

U.S. PATENT DOCUMENTS

| | | | |
|---|---|---|---|
| 6,687,752 B1* | 2/2004 | Falco et al. | 709/230 |
| 2005/0036512 A1* | 2/2005 | Loukianov | 370/469 |
| 2008/0140767 A1* | 6/2008 | Rao et al. | 709/203 |

* cited by examiner

*Primary Examiner*—Chirag G Shah
*Assistant Examiner*—Minh-Trang Nguyen

(57) ABSTRACT

A wireless LAN can be used to support audio communication sessions between wireless communication devices and wired communication devices both configured to operate according to the Internet Protocol. Both the wired and wireless communication devices generate and transmit frames of voice information over the LAN to each other and in the process of generating these frames they place a timestamp in each frame that is used by a receiving communications device to determine when the frame should be played in relationship to all of the other frames of voice information it receives. At times these communication devices can place incorrect timestamp values in the frames of audio information which can affect the quality of the communication experience for a user. I propose to correct any incorrect timestamp values by first recognizing that a timestamp value is incorrect and then rounding the value to the nearest frame boundary.

10 Claims, 6 Drawing Sheets

METHOD OF CONDUCTING A COMMUNICATIONS SESSION USING INCORRECT TIMESTAMPS

FIELD OF THE INVENTION

This invention relates generally to the field of wired and wireless communication in a LAN environment and specifically to conducting a communication session between communication devices designed to operate according to the IP protocol in which frames of incorrectly timestamped information are used.

BACKGROUND

Internet Protocol capable audio communication devices, whether they are wired or wireless, that format packets of audio information according to the RTP protocol for transmission to another communications device include, among other things, in the header field of each packet a timestamp value that represents a time reference when the packet is created. This time reference can be, for instance, based on the number of audio samples that have been generated during a communication session to that point. So, for instance, if the first packet of audio information transmitted during a communications session has a timestamp value of "Zero" and if there were eighty samples of audio information in each packet, the next packet transmitted would have a time stamp value of eighty, and so forth. Alternatively, the timestamp value could represent a synchronized network clock value at the point in time that the first sample in each frame was generated. Regardless of the mechanism used to create the timestamp, this value is used by an audio communications device that receives the packet to determine the current mean transmission delay time, the level of jitter that is being experienced, the order in which each packet is selected for processing and the time at which the packet should be "played" by the communications device. Under certain circumstances, a communications device that is generating packets of audio information may mark one or more of the packets with incorrect timestamp values. This can happen for a variety of reasons. For instance, if a communications device marks a packet with a timestamp value at the time the packet is transmitted as opposed to the time the packet was generated, normal variations in transmission delay would result in incorrect timestamp values.

As a consequence of the above, if the audio communications device is configured to process a packet containing 240 samples of audio information and receives timestamp values that are not valid, the device may try to play the packet at the wrong time ignore or the packet entirely. This has the effect of creating periods of silence and the loss of voice information during a communication session. So, for instance, if a current packet has a timestamp value of "4528" and a subsequent packet has a timestamp value of "4757", it is likely that the communications device would drop the first eleven samples of the subsequent packet therefore loosing the audio information contained in those eleven samples. On the other hand, if the communications device detects a timestamp value of "4510" in a current packet and a value of "4757" in a subsequent packet, there would be missing information between packets equivalent to the time it takes to play seven samples. This gap may be perceived by the user as sharp clicking sounds, stuttering or periods of silence. Generally speaking, the behavior of a communications device to packets it perceives as arriving early or late has a denigrating effect on the overall quality of a communications session.

So, it would be advantageous if a communications device was capable of processing incorrectly timestamped packets of audio information as if the packets were correctly timestamped. Further, the quality of a communications session would be improved if entire or portions of incorrectly timestamped packets were not discarded by the receiving communications device. I have solved this problem by inventing a method that enables a wired or wireless communications device to maintain a high quality communications session in the presence of incorrectly timestamped packets of audio information by modifying the timestamps of incoming packets, if they deviate by no more than a specified amount, so that the timestamp value coincides with the closest frame boundary.

SUMMARY OF THE INVENTION

In the preferred embodiment of my invention, a wireless communications device detects and stores the timestamp value of a current audio frame and if it determines that the timestamp value is not correct it modifies the incorrect timestamp value to be the value of the nearest frame boundary before continuing to process the audio frame. In another embodiment of my invention, the wireless communications device does not modify an incorrect timestamp value if the difference between the stored timestamp value and the nearest frame boundary value is greater than a specified tolerance.

DETAILED DESCRIPTION OF THE INVENTION

Figure 1:
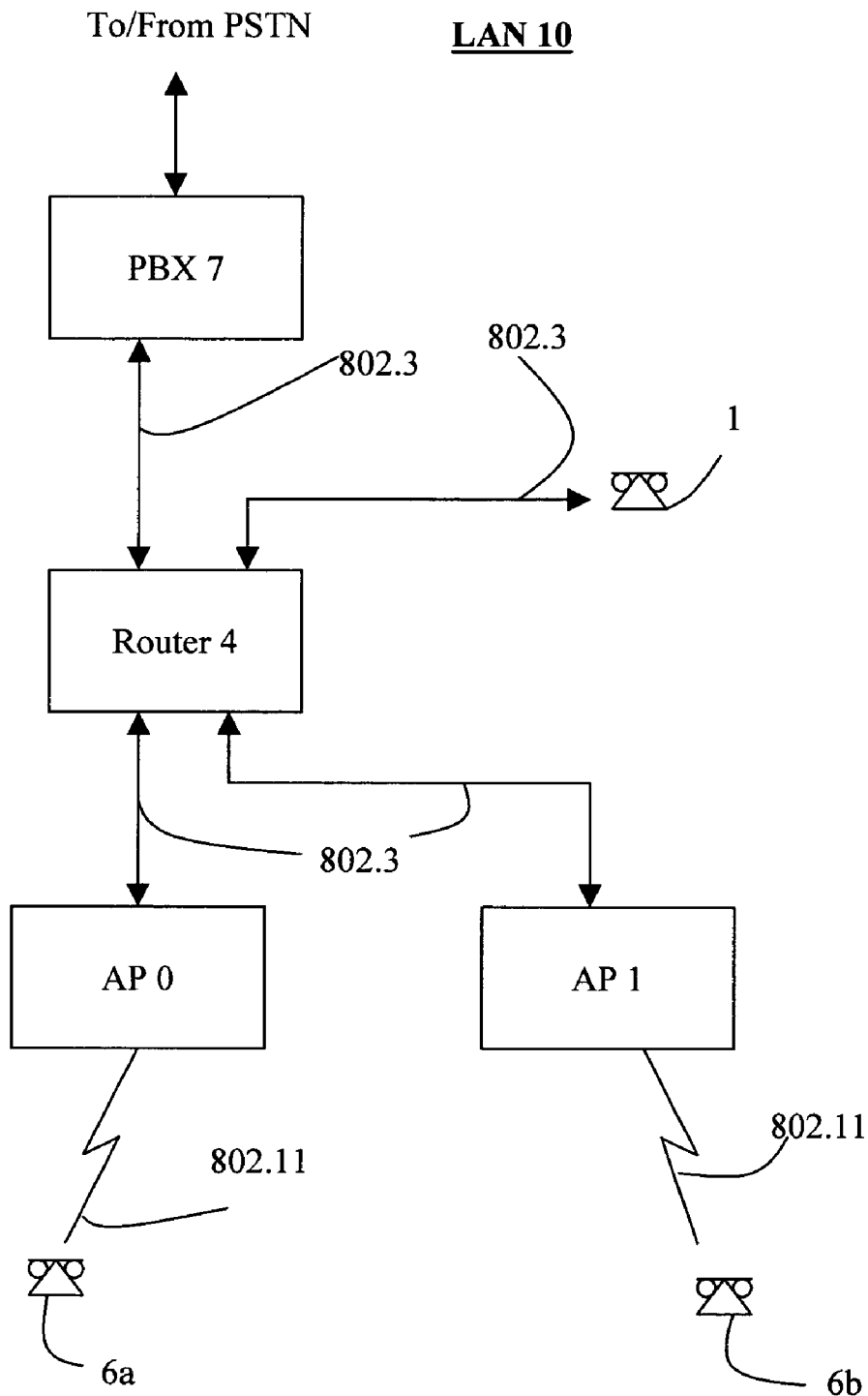
FIG. 1 is a high level block diagram of a LAN with both wireless and wired phones capable of generating packets of audio information in the IP format.

An exemplary environment in which my invention operates is illustrated by the LAN 10 of FIG. 1. This LAN encompasses both wired and wireless portions. Wired communications devices, which can be IP capable phone 1, generally operates to capture digital samples of an analog audio waveform at a particular sampling rate, compand and possibly encrypt this digital sample, and then place this audio information into packets in the well known RTP format for transmission over the LAN. As part of this process, the IP phone typically creates a timestamp that it places in a particular field of an RTP header associated with an audio packet which can represent a time reference when the packet was created or transmitted. Generally speaking, all packets transmitted over the wired portion of the LAN are formatted and observe a protocol that is defined in the IEEE 802.3 specification otherwise known as Ethernet. A router 4 generally operates to receive packets from the IP phone 1, the PBX 7 and from the access points (AP) 5a and 5b and to forward the packets to a destination specified by an IP address associated with the packet. The access points 5a and 5b both operate to receive packets of audio information over the wireless medium from the wireless communications devices 6a and 6b respectively and to forward these packets over the wired portion of the LAN 10 to the destinations indicated by an IP address contained in the packet. I will not offer a detailed description of the operation of the intermediate communication devices such as router 4 or of the access points 5a and 5b as commercial devices such as these are readily available and their operation is well understood by those skilled in the art of LAN communications. Also, it should be understood, that although I have described my invention in terms of particular intermediate communication devices, it is not limited to operating with these devices. For instance, it may not be necessary to include the router or some other device could be included to perform some special network functionality not related to my invention.

As described above, either one of the IP phones 1a and 1b can generate and transmit timestamped packets of audio information. These packets can be transmitted to either or both of the wireless IP capable phones 6a and 6b. Upon receipt of a packet, the wireless phone will, among other things, examine the timestamp contained in the audio packet and determine if it is a valid timestamp value. If the timestamp value is valid, the packet is processed in a normal fashion; however, if the timestamp value is not valid, a portion or the entire packet could be discarded or not "played" resulting in unexpected and unacceptable periods of silence during a communication session. I will describe in detail how a wireless phone determines the validity of a packet later with reference to FIGS. 5a, 5b and 5c. And finally, the PBX 7 generally operates as a switch to receive audio packets from both the server 3 and the router 4 and to forward them to a public switched telephone network (PSTN) 8 for instance.

Figure 2:
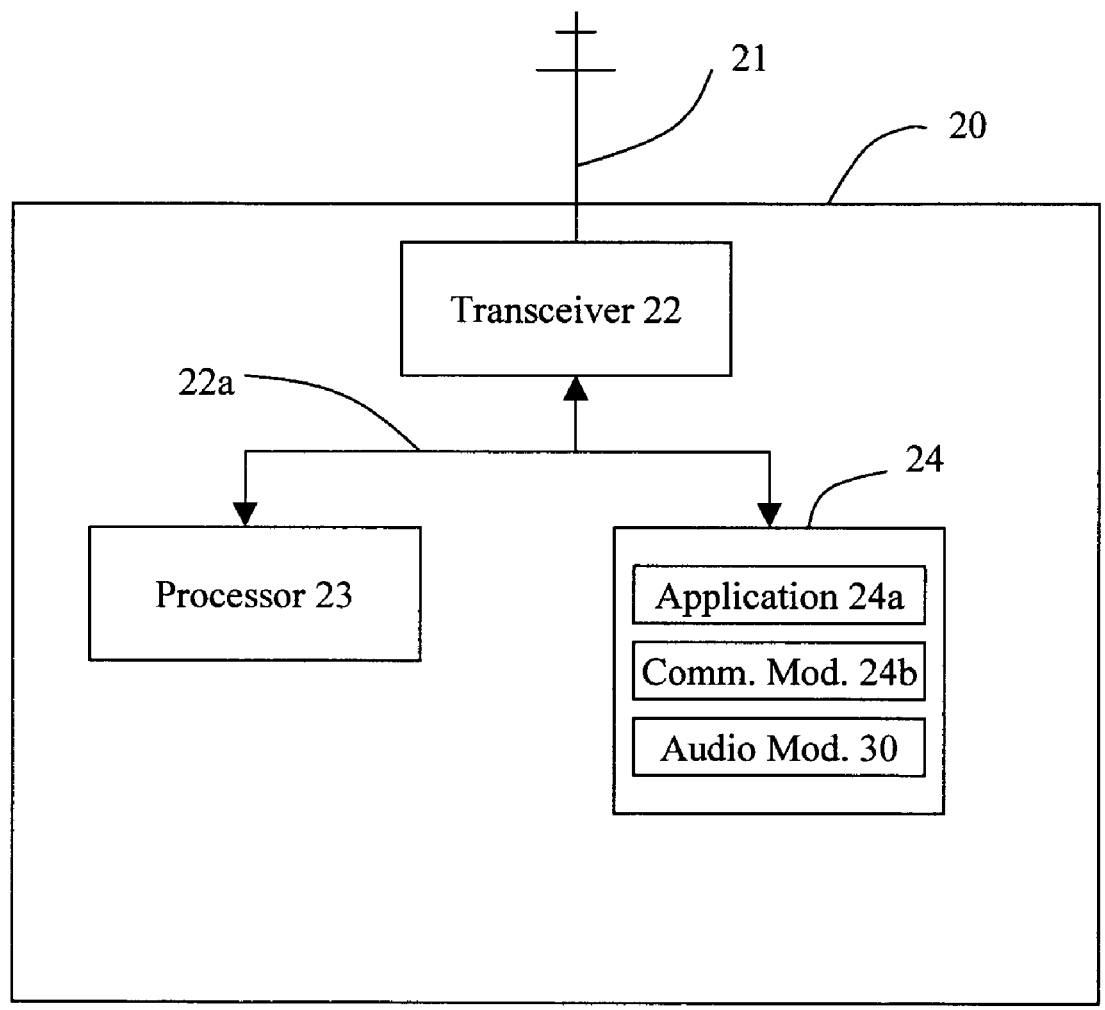
FIG. 2 is a functional block diagram of a wireless communications device capable of receiving audio packets in the IP format.

I will now proceed, with reference to FIG. 2, to describe a wireless phone 20 that can be employed to implement the method of my invention. The wireless phone includes an antenna 21 that serves as the phones interface with the wireless medium and operates to propagate wireless signals and is the initial reception point for incoming wireless signals. The antenna is connected to a transceiver 22, which operates to demodulate the wireless signals containing packets of voice/audio information received from the antenna and the transceiver operates to modulate signals prior to their being sent to the antenna. The transceiver is connected over a bus 22a to a processor 23 and memory 24. Although not shown, the phone 20 also includes input/output user interface element like a microphone and speaker, a display element of some sort and a keyboard element. Although these elements are essential to the operation of the phone, they are not essential to the operation of my invention and so will not be described in any detail.

Continuing to refer to FIG. 2, processor 23 generally functions in conjunction with a telephony application 24a stored in memory 24 to perform certain functions necessary for the operation of the phone. The telephone application generally controls such functionality as initiating, maintaining, and tearing down communications sessions. The telephone application does not have a direct effect on my invention and so will not be described here in detail, never-the-less, similar applications are used on other wireless communications devices and their design and functionality is well understood by wireless communications engineers. Communications module 24b also stored in memory 24 includes medium access control (MAC) functionality and mid-stack functionality. The MAC functionality is well known and generally manages the physical link to the wireless LAN which includes, among other things, 802.11 packetization. The mid-stack generally refers to IP protocol stack communications functionality above the MAC layer which starts at the LLC layer and includes network and transport layer functionality. Both the MAC and mid-stack functionality are well known and have no special effect on the operation of my invention and so will not be discussed here in any detail.

Continuing to refer to FIG. 2, an audio module 30 generally operates to digitize an analog audio signal it receives from a user interface such as a microphone, compand and possibly encrypt the digitized audio information and place the digitized audio information into an RTP packet format. As part of this packetization process, a timestamp value indicative of the relative network time of creation of the packet is placed in an RTP header associated with the packet. This RTP packet is then transmitted to the mid-stack. In the other direction, the audio module receives RTP packets from the mid-stack that the wireless phone receives from some other communications device on the network, which can be the wired phone 1a of FIG. 1 for instance. The RTP packets are temporarily buffered in memory 24 where the header is examined for, among other things, a time stamp value which is indicative of the relative time of the packets creation at wired phone 1a. The packet is decrypted, de-companded and converted from digital signal to an analog signal to be played out over another user interface such as a speaker for instance.

Figure 3:
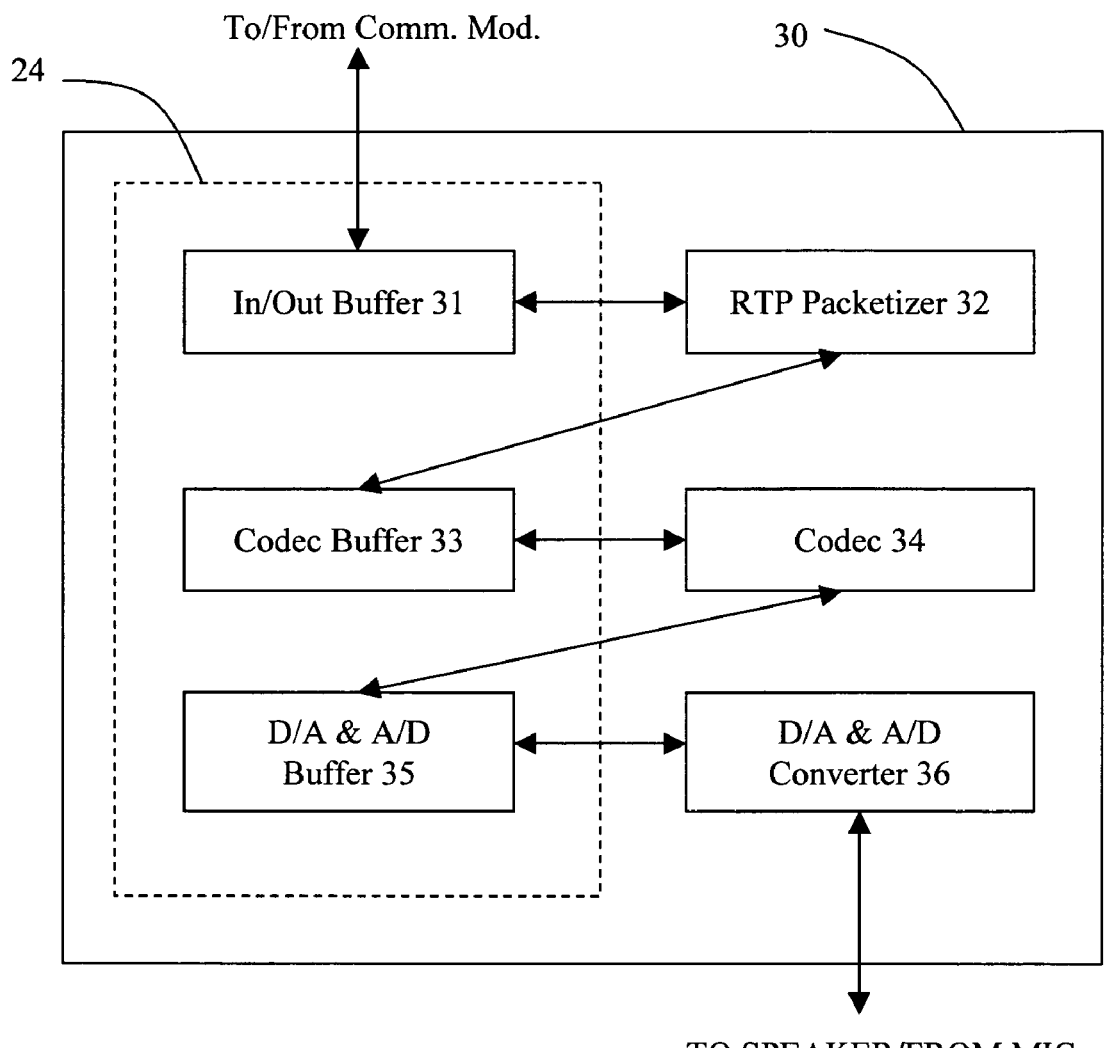
FIG. 3 is a functional block diagram of the audio module associated with the wireless communications device of FIG. 2.

Referring now to FIG. 3, I will describe the sub-modules composing the audio module 30 functionality. FIG. 3 illustrates the audio module as operating in two directions; namely, it operates in a first direction to receive and process for playing packets of audio information from the communications module 24b and it operates in a second direction to receive audio samples from a microphone that are placed into a frame and then packetized for transmission to the communications module, I will only describe the operation of the audio module from the perspective of its operation in the first direction, as this direction is relevant to the operation of my invention. Buffer 31 operates to temporarily store RTP packets the audio module receives from the mid-stack. The RTP packetization sub-module 32 operates on the RTP packets stored in buffer 31 to, among other things, examine a time stamp value associated with the packet and to strip the header information from the frame of audio information The RTP packet field format will be described later in detail with reference to FIG. 4. The RTP packetization sub-module 32 then passes the frame of audio information to a buffer 33, which operates to temporarily store the frame for processing by the codec 34 which decodes the frames of audio information. In this case, a frame audio information is composed of two hundred forty 125 usec samples of audio information, which makes each frame 30 milliseconds in length. Each frame of audio information is encoded or decoded according to any of the number of well known audio codecs as described in the ITU-T standard specifications for G711 or G729 for instance. Digital to analog and analog to digital converter buffer 35 receives the decoded frame and operates to temporarily store a digital representation of the audio information. This frame of audio information is operated on by a D/A converter 36 which transforms the audio into analog audio information respectively which is then played by the communications device at a speaker for instance. Although I have described three separate buffers, 31, 33 and 35 above, it should be understood that these buffers can be thought of as three logically separate temporary storage locations or three address ranges within memory 24.

Continuing to refer to FIG. 3, generally, the audio module 30 operates to receive RTP packets of audio information from the communication module and temporarily store them in buffer 31. More specifically, and with respect to the novel aspects of this design, at the beginning of a communication session between wired phone 1a and wireless phone 6a of FIG. 1, the wireless phone MAC functionality receives an initial or current IP packet of audio information and at the mid-stack module this packet is converted from a packet in the IP format to an RTP packet by stripping off the IP header and any UDP header if present. Eventually, the audio module receives the RTP packet and examines the header for the timestamp value associated with the packet. This timestamp value is stored and the communications device utilizes this stored timestamp value to determine if it is valid. The process I use to determine whether or not the frame contains a valid timestamp will be described later with reference to FIG. 6. If the packet contains a valid timestamp, it is then processed in the normal fashion by the codec and the D/A converter for ultimate use by a user interface. On the other hand, if the packet does not contain a valid timestamp value, the audio module determines how to modify the timestamp value so that it is valid at which point the frame can be processed in the normal fashion. The operation of the audio module 30 will be described further below with reference to FIGS. 4, 5a, 5b and 5c.

Figure 4:
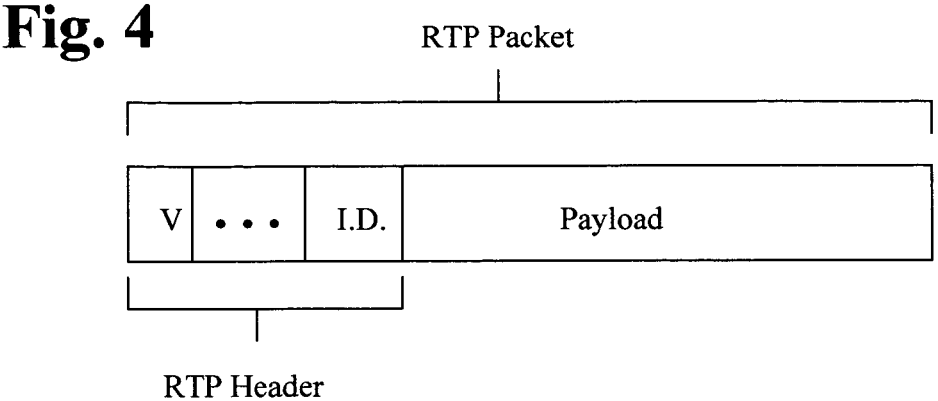
FIG. 4 illustrates the format of an audio RTP packet.

FIG. 4 is a diagram showing the RTP packet format with an RTP packet header of twelve octets and payload of some number of bits depending upon the number of samples in the frame of audio information. The diagram shows an I.D. field which contains a timestamp value occupying octets five, six, seven and eight in the header. As mentioned previously, this timestamp value indicates the time reference when the packet was created and is used by a receiving phone to determine, among other things, when to play the packet of audio information. In the context of a data network, as long as the packets arrive and can be ordered correctly, the system works fine On the other hand, in a voice communications network, incorrect timestamp values have an observable effect on the quality of a communications session. So, for instance, in the event that an RTP packet contains a timestamp value that results in a wireless phone playing the packet early or late by one or more sample times, these packets may be dropped by the phone which creates voids/holes/dead time in the stream of voice information. This silent time can sound like pops or clicks during a communications session and can be objectionable to the user and generally lower the quality of the service.

I have discovered that by "rounding" incorrect timestamp values contained in a frame of audio information to the nearest frame boundary, at least these frames of audio information are not lost during course of a communications session. I will describe how this rounding functionality operates later with reference to FIG. 6.

My timestamp correction method improves the perceived quality of a voice communications session for the user.

Figure 5A:
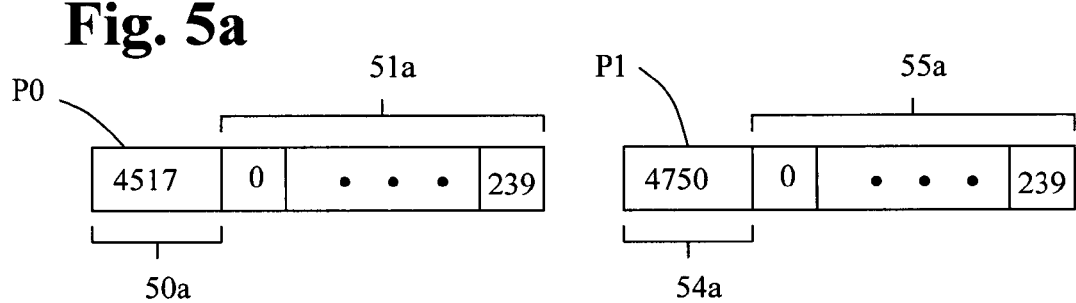
FIG. 5a illustrates an audio packet that is played early.

In order to understand the following description it should be assumed that the communications device receiving the audio packet is synchronized to a network clock such that the first sample in the first packet of a communications session will be captured and given a timestamp value of "4517", for example. This value (4517) can also be considered as the synchronization point for the communications device and the value the device maintains in its sample counter. It should also be understood, that each frame of audio information contains 240 samples. Turning now to FIG. 5a, which is a diagram showing two sequential RTP packets of voice information, an initial or current packet P0 and a next packet P1 respectively, with packet P1 shown with a timestamp that is seven samples earlier than it should be. In this case, the wireless phone would not recognize or could not play the beginning of packet P1 and therefore ignore at least the first seven samples of this packet of voice information which could results in these seven samples being ignored. More specifically, current packet P0 includes a header 50a with a timestamp value of "4517" and a payload 51a including two hundred and forty samples of digitized voice information which is represented by a first sample labeled "0" and a last sample labeled "239" in the figure. The next received packet P1 includes a header 54a with a timestamp value of "4750" and a payload 55a including two hundred forty samples of digitized voice information. Each time a packet is received, the audio application examines its timestamp value and determines whether or not it is valid. I will describe how the audio application comes to this determination later with reference to FIG. 6. Continuing to refer to FIG. 5a, it can be seen that packet P1 contains an invalid timestamp value as the communications device would try to play this packet seven time samples to early. According to my invention, the audio application determines that this is the case and corrects this timestamp value so that the phone would play it at the correct time. According to my invention, this correct play time is the closest frame boundary which in this case has a timestamp value of "4757". More specifically, and as will be described later in more detail with reference to FIG. 6, the audio application uses an initialization value that a counter is set to, the frame length in samples, and the incorrect timestamp value to calculate the closest frame boundary and then modify or round the incorrect timestamp value to this boundary value. In this case the timestamp value of the closest boundary is "4757", as mentioned above.

Figure 5B:
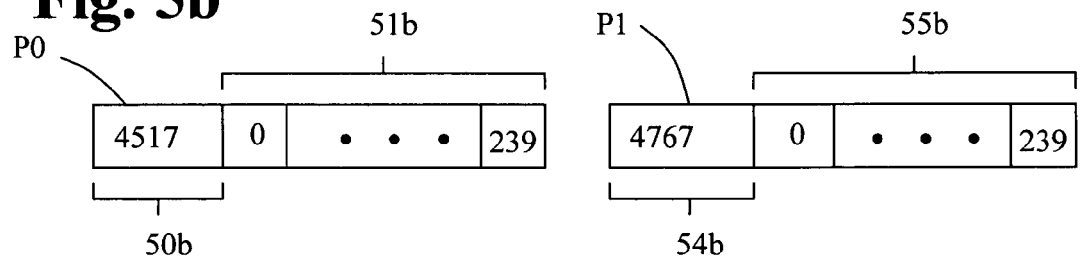
FIG. 5b illustrates an audio packet that is played late.

Referring now to FIG. 5b, which is a diagram showing two sequential RTP packets of voice information, P0 and P1 respectively, with packet P1 shown as arriving with a timestamp that is later than it should be. In this case, the wireless phone would play packet P1 late resulting in a period of silence equivalent to ten sample times. More specifically, the current packet P0 includes a header 50b with a timestamp value of "4517" and a payload 51b including two hundred forty samples of digitized voice information which is represented by a first sample labeled "0" and a last sample labeled "239". The next received packet P1 includes a header 54b with a timestamp value of "4767" and a payload 55b including two hundred forty samples of digitized voice information. According to the above scenario, the audio module after receiving the current packet P0, would examine the timestamp value and determine that it was invalid and then proceed to round the incorrect timestamp value down to the correct value of "4757".

Conceptually, it is possible for a frame to contain a timestamp with a value that is one hundred twenty samples in error, 4867 for instance, so a rule for which way to round to the nearest boundary value needs to be provided. In my invention, either rounding up or down in this case is acceptable, as long as a consistent rule is applied.

But as a practical matter, the communications device receiving a frame with such a timestamp error should probably treat the frame as a resynchronization point, so in a preferred embodiment of my invention, once the audio module determines that a timestamp is not valid it would then determine whether or not the error was within some tolerance range which could be up to twenty percent of the number of samples in the frame, which in this case is 48 samples.

Figure 5C:
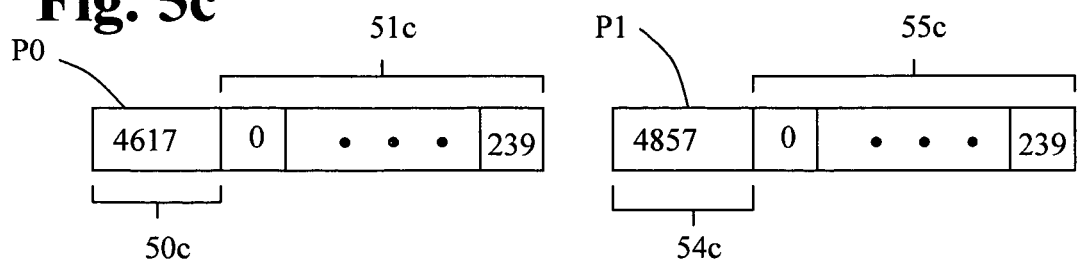
FIG. 5c illustrates an audio packet that is not played.

Referring now to FIG. 5c, which shows two packets, P0 and P1, where the timestamp error is outside the tolerance of the method of my invention, i.e., the difference between the expected timestamp value and the received timestamp value is more than twenty percent of the number of samples in a packet of audio information. In this case, the communications device perceives that packet P1 arrives with a timestamp that is one hundred samples later than it should be and since the method of my invention only operates to correct timestamps with values that do not deviate by the twenty percent tolerance rule, the frame would be treated as a synchronization point.

Figure 6A:
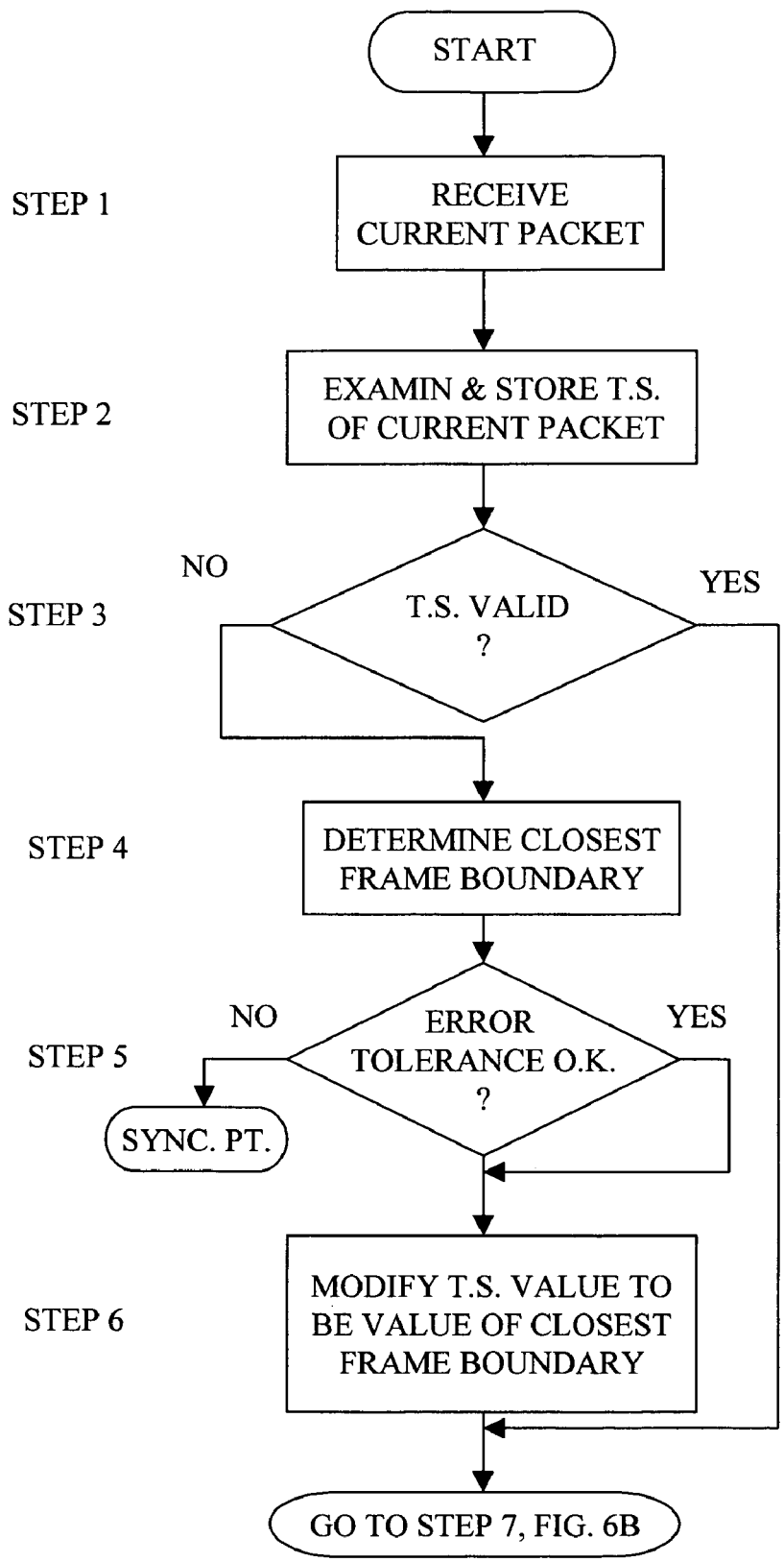
FIG. 6 is a logical flow diagram describing the method of my invention.

I will now describe the operation of my invention with reference to FIG. 6A. Also, I will assume for the purpose of this description, that a communications session has been initiated between two communications devices, wired phone 1 and wireless phone 6a for instance and that the current packet can be any packet received during the session including the first packet that phone 6a receives during the session. Now referring to FIG. 6A, in step 1 the audio module 30 receives a current RTP packet and temporarily stores it in buffer 31 of FIG. 3. In step 2, the RTP packetizer 32 of FIG. 3 examines the header of the current packet for, among other things, the timestamp value and then stores the timestamp value in memory 24 of FIG. 2. In step 3, the audio module determines whether the stored timestamp value is valid, and if it is the process proceeds to step 7, otherwise the process proceeds to step 4. Again referring to step 3, the audio module determines the validity of the timestamp value by subtracting the synchronization point sample value, which in this case is "4517", from the current frame timestamp value, which could be "4750" for instance. This operation results in a timestamp sample error value of 233 which is then divided by the frame length of 240 to arrive at a timestamp error factor value of 0.97. As the value 0.97 is not an even integer value, the audio module determines that the timestamp value to this frame is not correct and, as mentioned above, the process would proceed to step 4.

In step 4 of FIG. 6A, the audio module 30 determines the timestamp value of the closest frame boundary by rounding the timestamp error factor value of "0.97" to the nearest even integer, which is "1". The number of samples in a frame, or "240", is then multiplied by the even integer value, or "1", which results in a timestamp correction value, in this case "240" to be added to the synchronization point value of "4517" in order to arrive at the closest frame boundary timestamp value, which in this case is "4757". This value (4757) is then stored in memory 24 of FIG. 2 for later use and the process proceeds to step 5 where the audio module determines if the difference between the invalid timestamp value and the closest frame boundary is not greater than twenty percent of a frame sample size. Provided that the timestamp error is not greater than twenty percent, the process proceeds to step 6, otherwise the phone can use the invalid timestamp as a synchronization point or simply drop the frame all together. In step 6 the audio module retrieves the value "4757" stored in step 4 and changes the incorrect timestamp ("4750") value to be "4757" and then the process proceeds to step 7 in FIG. 6B.

Figure 6B:
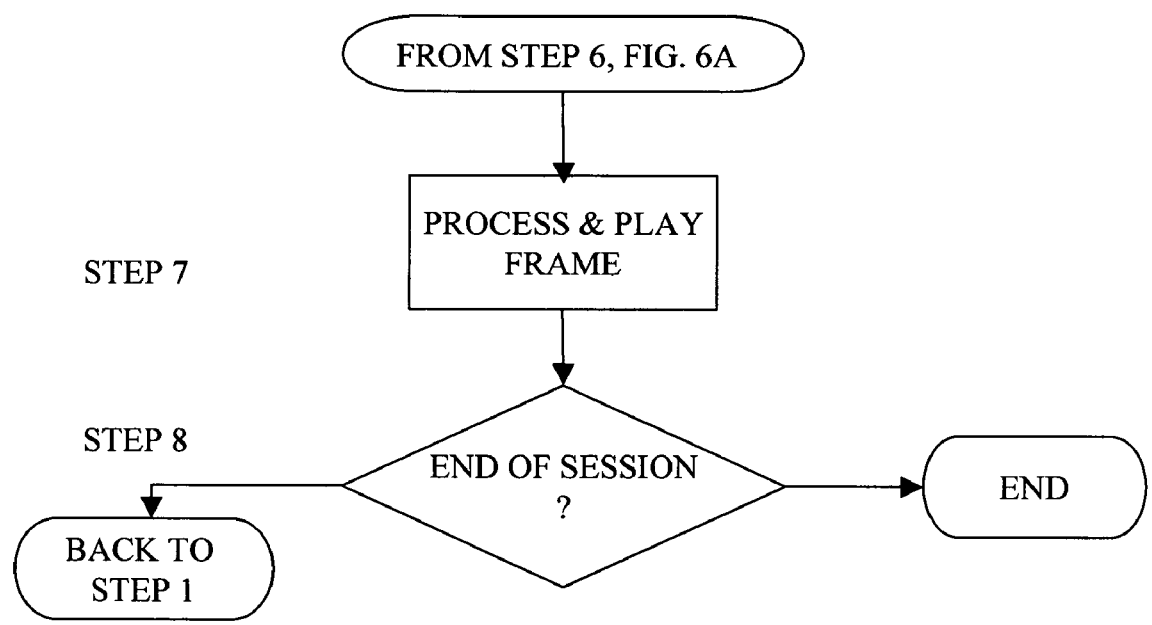

Referring now to FIG. 6B, in step 7 of the process, the frame of audio information with the now correct timestamp value is processed by the audio module and played in the normal fashion. At this point in step 8 if the audio module determines there are no more frames to be played, the communications session ends, otherwise the process returns to step 1 of FIG. 6A.

Although I have described the preferred embodiment of my invention in the context of a mixed wired and wireless network environment, it should not be limited to such a hybrid network. Rather, my invention works equally well in a network that is only wired or is only wireless. That is, the communications devices employed to implement my invention could all be either all wired or all wireless devices.

I claim:

1. In a local area network including a plurality of wireless communication devices and a plurality of intermediate communication devices, a method to conduct a communication session using incorrectly time stamped packets of audio information comprising the steps of:
   detecting and storing a timestamp value associated with a current received packet of audio information by at least one of the plurality of the wireless communications devices;
   determining that the stored timestamp value is not valid by calculating the difference between a synchronization point value and the stored timestamp value and dividing the difference by the number of audio samples in a frame resulting in an uneven timestamp error factor value;
   determining the nearest frame boundary value to the invalid timestamp value;
   modifying the stored timestamp value associated with the current packet of audio information to be a timestamp value associated with a nearest frame boundary; and
   processing the current received packet of audio information.

2. In a local area network including a plurality of wireless communication devices and a plurality of intermediate communication devices, a method to conduct a communication session using incorrectly time stamped packets of audio information comprising the steps of:
   detecting and storing a timestamp value associated with a current received packet of audio information by at least one of the plurality of the wireless communication devices;
   determining that the stored timestamp value is not valid;
   determining the nearest frame boundary value to the invalid timestamp value by rounding the timestamp error factor value to a nearest even integer, multiplying the rounded value by the number of audio samples in a frame which results in a timestamp correction value and adding the timestamp correction value to the synchronization point value to determine the nearest frame boundary timestamp value;
   modifying the stored timestamp value associated with the current packet of audio information to be a timestamp value associated with a nearest frame boundary; and
   processing the current received packet of audio information.

3. In a local area network including a plurality of wireless communications devices and a plurality of intermediate communication devices, a method to conduct a communication session using incorrectly time stamped packets of audio information comprising the steps of:
   detecting and storing a timestamp value associated with a current received packet of audio information by at least one of the plurality of the wireless communication devices;
   utilizing a synchronization point value, the stored timestamp value and the number of audio samples in a frame to determine that the stored timestamp value is not valid;
   utilizing a rounded timestamp error factor value, the number of audio samples in a frame and the synchronization point value to determine the nearest frame boundary value;
   modifying the stored timestamp value associated with the current packet of audio information to be a timestamp value associated with a nearest frame boundary; and
   processing the current received packet of audio information.

4. The method of claim 3 wherein at least one of the plurality of the wireless communication devices is an IP capable mobile phone.

5. The method of claim 3 wherein the intermediate communication devices are one or more of a public branch exchange, a router, a switch and an access point.

6. The method of claim 3 wherein the step of determining the invalidity of the stored timestamp value is comprised of:

calculating the difference between a synchronization point value and the stored timestamp value; and dividing the difference by a frame length resulting in an uneven timestamp error factor value.

7. The method of claim 3 wherein the step of determining the nearest frame boundary timestamp value is comprised of:

rounding the timestamp error factor value to a nearest even integer;

multiplying the rounded value by the number of samples in a frame which results in a timestamp correction value; and adding the timestamp correction value to the synchronization point value to determine the nearest frame boundary timestamp value.

8. In a local area network including a plurality of wireless communication devices and a plurality of intermediate communication devices, a method to conduct a communication session using incorrectly time stamped packets of audio information comprising the steps of:

detecting and storing a timestamp value associated with a current received packet of audio information by at least one of the plurality of the wireless communication devices;

determining that the stored timestamp value is not valid by calculating the difference between a synchronization point value and the stored timestamp value and dividing the difference by a frame length resulting in an uneven timestamp error factor value;

rounding the timestamp error factor value to a nearest even integer, multiplying the rounded value by the number of samples in a frame which results in a timestamp correction value which is added to the synchronization point value to determine the nearest frame boundary value determining that the difference between the stored timestamp value and the nearest frame boundary value is not greater than a specified tolerance;

modifying the stored timestamp value associated with the current packet of audio information to be a timestamp value associated with a nearest frame boundary; and processing the current received packet of audio information.

9. The method of claim 8 wherein at least one of the plurality of the wireless communication devices is an IP capable mobile phone.

10. The method of claim 8 wherein the intermediate communication devices are one or more of a public branch exchange, a router, a switch and an access point.

* * * * *